3,635,984
1,2,3,4,6,7-HEXAHYDRO-11bH-
BENZO[a]QUINOLIZINES
William J. Houlihan and Robert E. Manning, Mountain
Lakes, N.J., assignors to Sandoz-Wander, Inc., Hanover, N.J.
No Drawing. Division of application Ser. No. 642,311,
May 31, 1967, now Patent No. 3,502,679, which is a
continuation-in-part of application Ser. No. 480,479,
Aug. 17, 1965, now Patent No. 3,383,388. This application Dec. 18, 1969, Ser. No. 886,352
Int. Cl. C07d 35/10
U.S. Cl. 260—286 R                 7 Claims

ABSTRACT OF THE DISCLOSURE

11b - R - 1,2,3,4,6,7 - hexahydro - 11bH - benzo[a]
quinolizines are useful as analeptics, anti-inflammatories
and hypotensive-antihypertensives. They are prepared
from β-phenethylamines and ω-acylalkylenecarboxylic
acids having from two to four carbons in the alkylene
chain.

---

This application is a division of application Ser. No.
642, 311, filed May 31, 1967, which, in turn, is a continuation-in-part of application Ser. No. 480,479, filed Aug. 17,
1965 now U.S. 3,502,679 and 3,383,388 respectively.

This invention is directed to pharmaceutically active
and pharmaceutically acceptable isoquinolines of the formula

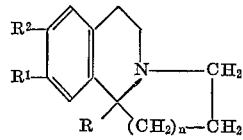

(I)

wherein

R is either lower alkyl, e.g. methyl, ethyl, propyl, isopropyl and butyl; monocyclic aryl of the formula

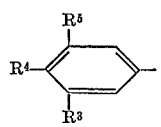

e.g. phenyl and 3,5-dichlorophenyl; benzyl; p-chlorobenzyl; phenethyl; phenylpropyl; β,β-diphenylethyl; γ,γ-diphenylpropyl; α-furyl; β-furyl; α-thienyl; 2-pyridyl; 3-pyridyl or 4-pyridyl;

each of $R^1$ and $R^2$ is, independently, either a hydrogen atom (—H); lower alkoxy (preferably having from 1 to 4 carbon atoms), e.g. methoxy, ethoxy, propoxy, isopropoxy and butoxy; or, taken together, methylenedioxy (—O—CH$_2$—O);

each of $R^3$, $R^4$ and $R^5$ is, independently, either a hydrogen atom (—H); a chlorine atom (—Cl); a fluorine atom (—F); nitro (—NO$_2$); lower alkyl (preferably having from 1 to 4 carbon atoms), e.g. methyl, ethyl, propyl, isopropyl and butyl; lower alkoxy (preferably having from 1 to 4 carbon atoms), e.g. methoxy, ethoxy, propoxy, isopropoxy and butoxy; or taken together with its adjacent counterpart, methylenedioxy (—O—CH$_2$—O—)

and n is either 1, 2 or 3; and to pharmaceutically acceptable acid addition and quaternary ammonium salts thereof.

Compounds I are prepared according to the following reaction scheme:

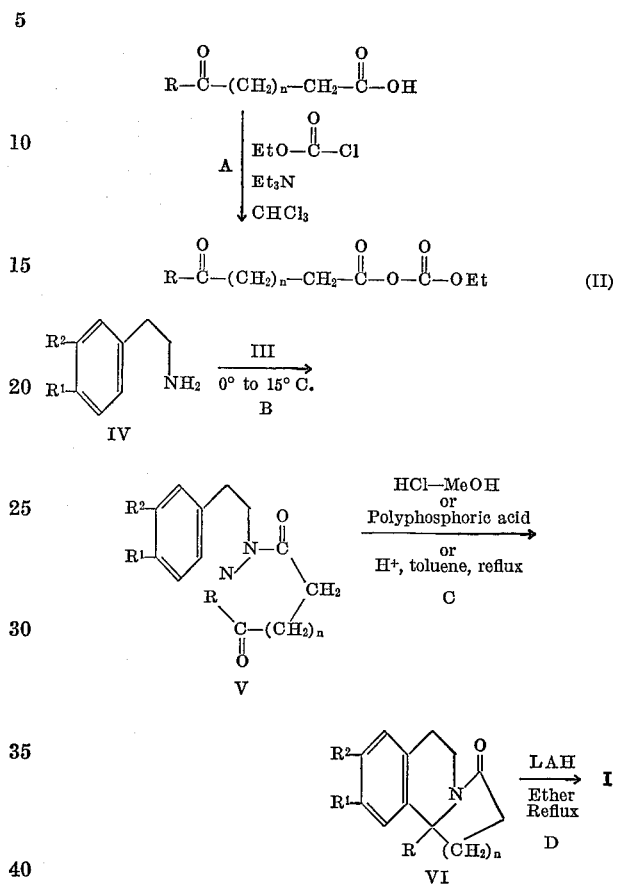

wherein each of R, $R^1$, $R^2$ and n has its above-ascribed meaning, as it does throughout the specification. According to the reaction scheme steps A and B are effected sequentially (without separation) to form a mixed anhydride V by admixing ethyl chloroformate (ethyl chlorocarbonate) with a keto acid II and triethylamine in chloroform at a temperature from 0° to 15° C., followed by the admixture of a β-phenethylamine IV with the resultant (maintained in the same temperature range).

Step C is a cyclization. It is effected with from a 0.5 to a 5.0 percent methanolic solution of hydrogen chloride at a temperature from room temperature (20° C.) to reflux. Alternatively, it is effected with polyphosphoric acid (PPA) at a temperature from 60° to 120° C. or with an acid, such a paratoluenesulfonic acid, in toluene under reflux.

Step D is effected by refluxing (with stirring) with lithium aluminum hydride (LAH) in an ether, such as diethylether, dibutylether, tetrahydrofuran and dioxane.

Compounds II and IV are either known compounds or are prepared according to standard procedures from available compounds.

Illustrative compounds I (in free base form) are prepared according to the preceding reaction scheme and the ensuing specific examples from indicated compounds II and IV and through corresponding intermediates III, V and VI, as follows:

tracted with methylene chloride; the organic extract is dried over sodium sulfate and evaporated; crude compound II is thus obtained.

TABLE

| II | IV | I |
|---|---|---|
| 4-(β-furylcarbonyl)butyric acid | 3-isopropoxy-β-phenethylamine | 9-isopropoxy-11b-(β-furyl)-1,2,3,4,6,7-hexahydro-11bH-benzo[a]quinolizine. |
| 5-(α-thienylcarbonyl)valeric acid | 3-butoxy-β-phenethylamine | 10-butoxy-12b-(α-thienyl)-1,2,3,4,5,7,8,12b-octahydroazepino[2,1-a]isoquinoline. |
| 3-(β-thienylcarbonyl)propionic acid | 3,4-methylenedioxy-β-phenethylamine | 8,9-methylenedioxy-10b-(β-thienyl)-1,2,3,5,6,10b-hexahydropyrrolo[2,1-a]isoquinoline. |
| 4-(2-pyridylcarbonyl)butyric acid | 3-methoxy-β- | 9-methoxy-11b-(2-pyridyl)-1,2,3,4,6,7-hexahydro-11bH-benzo[a]quinolizine. |
| 5-(3-pyridylcarbonyl)valeric acid | 4-methoxy-β-phenethylamine | 11-methoxy-12b-(3-pyridyl)-1,2,3,4,5,7,8,12b-octahydroazepino[2,1-a]isoquinoline. |
| 3-(4-pyridylcarbonyl)propionic acid | 4-ethoxy-β-phenethylamine | 9-ethoxy-10b-(4-pyridyl)-1,2,3,5,6,10b-hexahydropyrrolo-[2,1-a]isoquinoline. |
| γ-Benzyl-γ-ketobutyric acid | 3-ethoxy-β-phenethylamine | 8-ethoxy-10b-benzyl-1,2,3,5,6,10b-hexahydropyrrolo[2,1-a]isoquinoline. |
| 5-keto-7-phenylheptanoic acid | 4-methoxy-β-phenethylamine | 10-methoxy-11b-(β-phenethyl)-1,2,3,4,6,7-hexahydro-11bH-benzo[a]quinolizine. |
| 6-keto-9-phenylnonanoic acid | 3,4-methylenedioxy-β-phenethylamine | 10,11-methylenedioxy-12b-(γ-phenylpropyl)-1,2,3,4,5,7,8,12b-octahydroazepino[2,1-a]isoquinoline. |
| 6,6-diphenyl-4-ketohexanoic acid | 3-methoxy-β-phenethylamine | 8-methoxy-10b-(β,β-diphenylethyl)-1,2,3,5,6,10b-hexahydropyrrolo[2,1-a]isoquinoline. |
| 8,8-diphenyl-5-ketooctanoic acid | 4-ethoxy-β-phenethylamine | 10-ethoxy-11b-(γ,γ-diphenylpropyl)-1,2,3,4,6,7-hexahydro-11bH-benzo[a]quinolizine. |
| 3-benzoylpropionic acid | β-Phenethylamine | 10b-phenyl-1,2,3,5,6,10b-hexahydropyrrolo[2,1-a]isoquinoline. |
| 4-benzoylbutyric acid | do | 11b-phenyl-1,2,3,4,6,7-hexahydro-11bH-benzo[a]quinolizine. |
| Do | 3,4-dimethoxy-β-phenethylamine | 9,10-dimethoxy-11b-phenyl-1,2,3,4,6,7-hexahydro-11bH-benzo[a]quinolizine. |
| 3-butyrylpropionic acid | do | 8,9-dimethoxy-10b-propyl-1,2,3,5,6,10b-hexahydropyrrolo-[2,1-a]isoquinoline. |
| γ-Benzyl-γ-ketobutyric acid | do | 8,9-dimethoxy-10b-benzyl-1,2,3,5,6,10b-hexahydropyrrolo-[2,1-a]isoquinoline. |
| Levulinic acid | 3,4-methylenedioxy-β-phenethylamine | 8,9-methylenedioxy-10b-methyl-1,2,3,5,6,10b-hexahydropyrrolo-[2,1-a]isoquinoline. |
| 4-propionylbutyric acid | 3-methoxy-β-phenethylamine | 9-methoxy-11b-ethyl-1,2,3,4,6,7-hexahydro-11bH-benzo[a]quinolizine. |
| 5-butyrylvaleric acid | 3-ethoxy-4-methoxy-β-phenethylamine | 10-ethoxy-11-methoxy-12b-propyl-1,2,3,4,5,7,8,12b-octahydroazepino-[2,1-a]isoquinoline. |
| 3-(α-methylpropionyl)propionic acid | 4-ethoxy-β-phenethylamine | 9-ethoxy-10b-isopropyl-1,2,3,5,6,10b-hexahydropyrrolo-[2,1-a]isoquinoline. |
| 4-valerylbutyric acid | 3-methoxy-4-propoxy-β-phenethylamine | 9-methoxy-10-propoxy-11b-butyl-1,2,3,4,6,7-hexahydro-11bH-benzo[a]quinolizine. |
| 5-(3,4-dimethylbenzoyl)valeric acid | 3-ethoxy-4-isopropoxy-β-phenethylamine | 10-ethoxy-11-isopropoxy-12b-(3,4-dimethylphenyl)-1,2,3,4,5,7,8,12b-octahydroazepino[2,1-a]isoquinoline. |
| 3-(3-chloro-5-ethyl-4-methoxybenzoyl)propionic acid | 4-butoxy-3-methoxy-β-phenethylamine | 8-methoxy-9-butoxy-10b-(3-chloro-5-ethyl-4-methoxyphenyl)-1,2,3,5,6,10b-hexahydropyrrolo[2,1-a]isoquinoline. |
| 4-(3,4-difluoro-5-propylbenzoyl)butyric acid | 3-ethoxy-β-phenethylamine | 9-ethoxy-11b-(3,4-difluoro-5-propylphenyl)-1,2,3,4,6,7-hexahydro-11bH-benzo[a]quinolizine. |
| 5-(4-chloro-5-isopropyl-3-nitrobenzoyl)valeric acid | 4-methoxy-β-phenethylamine | 11-methoxy-12b-(4-chloro-5-isopropyl-3-nitrophenyl)-1,2,3,4,5,7,8,12b-octahydroazepino[2,1-a]isoquinoline. |
| 4-(3-butyl-5-methoxybenzoyl)-butyric acid | 3,4-methylenedioxy-β-phenethylamine | 9,10-methylenedioxy-11b-(3-butyl-5-methoxyphenyl)-1,2,3,4,6,7-hexahydro-11bH-benzo[a]quinolizine. |
| 3-(3-ethoxy-4,5-methylenedioxybenzoyl)propionic acid | 4-ethoxy-3-methoxy-β-phenethylamine | 8-methoxy-9-ethoxy-10b-(3-ethoxy-4,5-methylenedioxyphenyl)-1,2,3,5,6,10b-hexahydropyrrolo[2,1-a]isoquinoline. |
| 5-(4-ethoxy-3-propoxybenzoyl)valeric acid | β-Phenethylamine | 12b-(4-ethoxy-3-propoxyphenyl)-1,2,3,4,5,7,8,12b-octahydroazepino[2,1-a]isoquinoline. |
| 3-(4-ethyl-3-isopropoxybenzoyl)propionic acid | 4-methoxy-β-phenethylamine | 9-methoxy-10b-(4-ethyl-3-isopropoxyphenyl)-1,2,3,5,6,10b-hexahydropyrrolo[2,1-a]isoquinoline. |
| 4-(3-butoxy-4-nitrobenzoyl)butyric acid | 3-methoxy-β-phenethylamine | 9-methoxy-11b-(3-butoxy-4-nitrophenyl)-1,2,3,4,6,7-hexahydro-11bH-benzo[a]quinolizine. |
| 5-(3,4-methylenedioxybenzoyl)valeric acid | 3,4-diethoxy-β-phenethylamine | 10,11-diethoxy-12b-(3,4-methylene-dioxyphenyl)-1,2,3,4,5,7,8,12b-octahydroazepino[2,1-a]isoquinoline. |
| 3-(α-furylcarbonyl)propionic acid | 3-propoxy-4-methoxy-β-phenethylamine | 8-propoxy-9-methoxy-10b-(α-furyl)-1,2,3,5,6,10b-hexahydropyrrolo[2,1-a]isoquinoline. |
| 3-benzoylpropionic acid | 3,4-dimethoxy-β-phenethylamine | 8,9-dimethoxy-10b-phenyl-1,2,3,5,6,10b-hexahydropyrrolo-[2,1-a]isoquinoline. |
| γ-(p-Chlorobenzyl)-γ-ketobutyric acid | do | 8,9-dimethoxy-10b-(p-chlorobenzyl)-1,2,3,5,6,10b-hexahydropyrrolo isoquinoline. |
| δ-(p-Chlorobenzyl)-δ-ketovaleric acid | do | 9,10-dimethoxy-11b-(p-chlorobenzyl)-1,2,3,4,6,7-hexahydro-11bH-benzo[a]quinolizine. |
| 6-phenyl-5-ketohexanoic acid | β-Phenethylamine | 11b-benzyl-1,2,3,4,6,7-hexahydro-11bH-benzo[a]quinolizine. |
| 7-phenyl-6-ketoheptanoic acid | 3-methoxy-β-phenethylamine | 10-methoxy-12b-benzyl-1,2,3,4,5,7,8,12b-octahydroazepino[2,1-a] isoquinoline. |
| 4-(α-thienylcarbonyl)butyric acid | 4-methoxy-β-phenethylamine | 10-methoxy-11b-(α-thienyl)-1,2,3,4,6,7-hexahydro-11bH-benzo[a] quinolizine. |
| 7-(p-Chlorophenyl)-6-ketoheptanoic acid | 3,4-dimethoxy-β-phenethylamine | 10,11-dimethoxy-12b-(p-chlorobenzyl)-1,2,3,4,5,7,8,12b-octahydroazepino[2,1-a]isoquinoline. |
| 6-keto-6-phenylhexanoic acid | 3,4-methylenedioxy-β-phenethylamine | 10,11-methylenedioxy-12b-phenyl-1,2,3,4,5,7,8,12b-octahydroazepino[2,1-a]isoquinoline. |

An alternative method for preparing compounds V is in accord with the following reaction scheme:

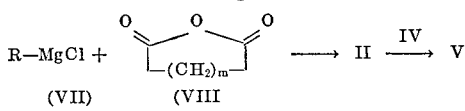

wherein a solution of a Grignard reagent VII is added to a solution of an anhydride VIII (succinic anhydride when $n=1$; glutaric anhydride when $n=2$; and adipic anhydride when $n=3$) with cooling; the thus-prepared reaction mixture is stirred for several hours prior to dilution with water followed by the addition thereto of, e.g., ammonium hydroxide; the resulting aqueous phase is made acidic with, e.g., hydrochloric acid and then extracted with methylene chloride; the organic extract is dried over sodium sulfate and evaporated; crude compound II is thus obtained.

Crude compound II, compound IV and, e.g., p-toluenesulfonic acid are refluxed in a suitable solvent, e.g. toluene, the water formed during the resulting reaction being removed; the refluxed solution is concentrated in vacuo, dissolved in a suitable solvent, e.g. chloroform, washed with, e.g., 2 N hydrochloric acid and then washed with, e.g., 2 N sodium carbonate solution; the thus washed material is then dried over sodium sulfate and evaporated in vacuo to obtain crude compounds V.

For this reaction R is preferably lower alkyl, e.g. methyl, ethyl and butyl, or phenyl(lower)alkyl, e.g. benzyl, phenethyl and phenylpropyl; alternatively R is phenyl, but the other meanings of R are not precluded.

The acid addition salts of compounds I are prepared according to known, well-established procedures from compounds I. Among the pharmaceutically acceptable acid addition salts are salts of organic acids, e.g. tartaric acid; inorganic acids, e.g. hydrochloric acid, hydrobromic acid and sulfuric acid; monobasic acids, e.g. an alkanesulfonic acid, such as methanesulfonic acid

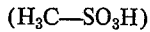

dibasic acids, e.g. succinic acid; tribasic acids, e.g. phosphoric acid and citric acid; saturated acids, e.g. acetic acid; ethylenically unsaturated acids, e.g. maleic acid and fumaric acid; and aromatic acids, e.g. salicyclic acid and arylsulfonic acids, such as benzenesulfonic acid. The only limitation on the acid selected is that the resulting acid addition salt be pharmaceutically acceptable; the acid does not nullify the therapeutic properties of compounds I. It is preferred, however, to select an acid so that the salt therewith is water-soluble; tartaric acid and succinic acid are preferred for this purpose.

The quaternary ammonium salts of prime interest are also those which are pharmaceutically acceptable, such as the lower alkyl halides, e.g. methiodide, ethyl bromide, methyl chloride; and lower alkyl sulfates, e.g. methyl sulfate. Suitable quaternizing agents and the resulting salts, as such, are well known to the art-skilled and do not, per se, constitute the essence of the invention. Quaternary ammonium salts and acid addition salts (including those of both classes which are not pharmaceutically acceptable) can be employed according to established procedures to obtain the corresponding pharmaceutically acceptable salts according to established procedures.

Compounds I, their pharmaceutically acceptable acid addition salts and their pharmaceutically acceptable quaternary ammonium salts are CNS-active compounds useful as antidepressants, analeptics, CNS stimulants, antiinflammatories and hypotensive-antihypertensives. They are administered to mammals either orally or parenterally in standard dosage forms, e.g. tablets and capsules, in daily doses of from ⅓ to 3 mg./kg. of body weight, e.g. from 20 to 200 milligrams, preferably in equally divided doses from 2 to 4 times per day.

Each of the pharmaceutically active compounds of this invention may be, e.g., incorporated, for oral administration, in a tablet as the sole active ingredient. A typical tablet is constituted by from 1 to 3 percent binder, e.g. tragacanth; from 3 to 10 percent distintegrating agent, e.g. corn starch; from 2 to 10 percent lubricant, e.g. talcum; from 0.25 to 1.0 percent lubricant, e.g. magnesium stearate; an average dosage of active ingredient; and q.s. 100 percent of filter, e.g. lactose; all percentages being by weight. Tablets are prepared according to standard tabletting techniques, which are well-known in the art, employing the necessary amounts of conventional granulating liquids, e.g. alcohol SD–30 and purified water. An exemplary tabletting formulation for the instant active compounds is:

|  | Parts |
|---|---|
| Title compound of Example 11 | 55 |
| Tragacanth | 2 |
| Lactose | 34.5 |
| Corn starch | 5 |
| Talcum | 3 |
| Magnesium stearate | 0.5 |
| Alcohol SD–30, q.s. | |
| Purified water, q.s. | |

The following examples are further illustrative of the invention. All temperatures are in degrees centigrade. Parts and percentages are by weight unless otherwise specified, the relationship between parts by weight and parts by volume being the same as that between the kilogram and the liter.

EXAMPLE 1

N-[2-(p-methoxyphenyl)ethyl]-3-benzoyl-propionamide

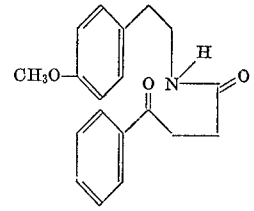

Add dropwise (over a period of one hour) to a stirred solution of 17.8 parts (0.10 mole) of 3-benzoylpropionic acid and 10.1 parts (0.10 mole) of triethylamine in 175 parts by volume of chloroform, within the temperature range of 0° to 5°, a solution of 10.8 parts (0.10 mole) of ethychloroformate in 25 parts by volume of chloroform. Stir the resultant for an additional three hours. To the thus-stirred solution, add dropwise (over a period of fifteen minutes) a chloroform solution of 15.1 parts (0.10 mole) of β-(4-methoxyphenyl)-ethylamine. Stir the thus-obtained reaction mixture over night (17 hours); extract same with dilute hydrochloric acid; wash with dilute sodium carbonate solution; dry over sodium sulfate and evaporate in vacuo. Crystallize the residue from benzene-pentane to obtain the title compound, melting point (M.P.) 96° to 97°.

Replacing the 3-benzoylpropionic acid with an equivalent of either 3-(p-chlorobenzoyl)propionic acid or 3-(3,5-dimethylbenzoyl)-propionic acid results in the preparation, in similar manner, of the corresponding compound V.

EXAMPLE 2

N-[2-(3,4-dimethoxyphenyl)ethyl]-4-oxo-valeramide

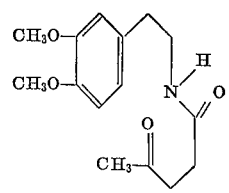

Add dropwise (over a period of one hour) to a stirred solution of 34.8 parts (0.30 mole) of levulinic acid and 30.6 parts (0.30 mole) of triethylamine in 175 parts by volume of chloroform, within the temperature range of 0° to 5°, a solution of 32.4 parts (0.30 mole) of ethylchloroformate in 25 parts by volume of chloroform. stir the resultant for an additional three hours. To the thus-stirred solution, add dropwise (over a period of fifteen minutes) a chloroform solution of 54.3 parts (0.30 mole) of β-(3,4-dimethoxyphenyl)-ethylamine. Stir the thus-obtained reaction mixture overnight; extract same with dilute hydrochloric acid; wash with dilute sodium carbonate solution; dry over sodium sulfate and evaporate in vacuo. Crystallize the residue from benzene-pentane to obtain the title compound, M.P. 88° to 90°.

Replacing the levulinic acid with an equivalent of either 5-oxohexanoic acid or 6-oxoheptanoic acid results in the preparation, in similar manner, of the corresponding compound V.

EXAMPLE 3

N-[2-(3,4-dimethoxyphenyl)ethyl]-4-benzoyl-
butyramide

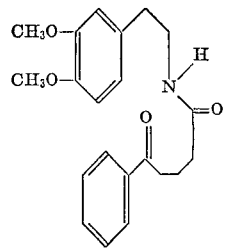

Add dropwise (over a period of one hour) to a stirred solution of 38.4 parts (0.20 mole) of γ-benzoylbutyric acid and 20.2 parts (0.20 mole) of triethylamine in 175 parts by volume of chloroform, within the temperature range of 0° to 5°, a solution of 21.6 parts (0.20 mole) of ethylchloroformate in 25 parts by volume of chloroform. Stir the resultant for an additional three hours. To the thus-stirred solution, add dropwise (over a period of fifteen minutes) a chloroform (150 parts by volume of chloroform) solution of 36.2 parts (0.20 mole) of β-(3,4-dimethoxyphenyl)-ethylamine. Stir the thus-obtained reaction mixture overnight; extract same with dilute hydrochloric acid; wash the dilute sodium carbonate solution; dry over sodium sulfate and evaporate in vacuo. Crystallize the residue from benzene-pentane (1:4) to obtain the title compound, M.P. 98°.

Replacing the γ-benzoylbutyric acid with an equivalent of either γ-(3,4-methylenedioxybenzoyl)butyric acid or β-(3-ethoxybenzoyl)butyric acid results in the preparation, in similar manner, of the corresponding compound V.

EXAMPLE 4

N-[2-(3,4-dimethoxyphenyl)ethyl]-5-
benzoylvaleramide

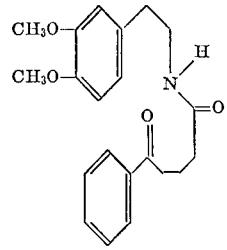

Add dropwise (over a period of one hour) to a stirred solution of 10.3 parts (0.05 mole) of 5-benzoylvaleric acid and 5.1 parts (0.05 mole) of triethylamine in 175 parts by volume of chloroform, within the temperature range of 0° to 5°, a solution of 5.4 parts (0.05 mole) of ethylchloroformate in 25 parts by volume of chloroform. Stir the resultant for an additional three hours. To the thus-stirred solution, add dropwise (over a period of fifteen minutes) a chloroform solution of 9.05 parts (0.05 mole) of β-(3,4-dimethoxyphenyl)-ethylamine. Stir the thus-obtained reaction mixture over night; extract same with dilute hydrochloric acid; wash with dilute sodium carbonate solution; dry over sodium sulfate and evaporate in vacuo. Crystallize the residue from benzene-pentane (1:4) to obtain the title compound, M.P. 84° to 85°.

Replacing the 5-benzoylvaleric acid with an equivalent of either 5-(3-fluorobenzoyl)valeric acid or 5-(4-nitrobenzoyl)valeric acid results in the preparation, in similar manner, of the corresponding compound V.

EXAMPLE 5

N-(2-phenylethyl)-3-benzoylpropionamide

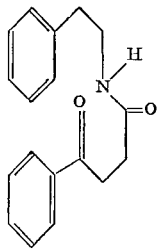

Add dropwise (over a period of one hour) to a stirred solution of 44.5 parts (0.25 mole) of 3-benzoylpropionic acid and 25.2 parts (0.25 mole) of triethylamine in 350 parts by volume of chloroform, within the temperature range of 0° to 5°, a solution of 28 parts (0.25 mole) of ethylchloroformate in 50 parts by volume of chloroform. Stir the resultant for an additional three hours. To the thus-stirred solution, add dropwise (over a period of fifteen minutes) a chloroform (150 parts by volume of chloroform) solution of 30.2 parts (0.25 mole) of 2-phenylethylamine. Stir the thus-obtained reaction mixture overnight; extract same with dilute hydrochloric acid; wash with dilute sodium carbonate solution; dry over sodium sulfate and evaporate in vacuo. Crystallize the residue from benzene-pentane (1:4) to obtain the title compound, M.P. 98°.

Replacing the 3-benzoylpropionic acid with an equivalent of the either 3-(3,5-dichlorobenzoyl)propionic acid or 3-(4-ethylbenzoyl)propionic acid results in the preparation, in similar manner, of the corresponding compound V.

EXAMPLE 6

10b-phenyl-1,2,3,5,6,10b-hexahydropyrrolo[2,1-a]
isoquinolin-3-one

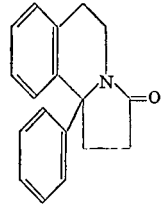

Heat a solution of 60 parts of N-(2-phenylethyl)-3-benzoylpropionamide in 600 parts of polyphosphoric acid at 100° for 16 hours. Admix the thus-obtained dark brown reaction mixture with 2000 parts by volume of water and 700 parts by volume of chloroform; wash the organic phase with 1 N sodium carbonate solution; dry same over sodium sulfate and evaporate under reduced pressure. Filter a solution of the thus-obtained residue in 2000 parts by volume of a 1:1 benzene-chloroform mixture through a bed of alumina and evaporate the eluant in vacuo. Crystallize the resultant oil from benzenepentane (1:4) to obtain the pure title compound, M.P. 88°.

Replacing the N-(2-phenethyl)-3-benzoylpropionamide with an equivalent of either N-[2-(p-methoxyphenyl)ethyl] - 3 - benzoylpropionamide or N-[2-(3,4-dimethoxyphenyl)ethyl]-4-oxovaleramide results in the preparation, in similar manner, of the corresponding compound VI.

EXAMPLE 7

N-(2-phenylethyl)-4-benzoylbutyramide

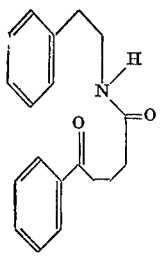

Add dropwise (over a period of one hour) to a stirred solution of 57.6 parts (0.30 mole) of γ-benzoylbutyric acid and 30.1 parts (0.30 mole) of triethylamine in 500 parts by volume of chloroform, within the temperature range of 0° to 5°, a solution of 32.7 parts (0.30 mole) of ethylchloroformate in 80 parts by volume of chloroform. Stir the resultant for an additional three hours. To the thus-stirred solution, add dropwise (over a period of fifteen minutes) a chloroform (150 parts by volume of chloroform) solution of 36.3 parts (0.30 mole) of 2-phenylethylamine. Stir the thus-obtained reaction mixture overnight; extract same with dilute hydrochloric acid; wash with dilute sodium carbonate solution; dry over sodium sulfate and evaporate in vacuo. Crystallize the residue form benzene-pentane (1:3) to obtain the title compound, M.P. 95° to 96°.

Replacing the γ-benzoylbutyric acid with an equivalent of either γ-(3,5-dimethoxybenzoyl)butyric acid or γ-(3-nitrobenzoyl)butyric acid results in the preparation, in similar manner, of the correspoding compound V.

EXAMPLE 8

11b-phenyl-1,2,3,6,7,11b-hexahydro-4H-benzo[a] quinolizin-4-one

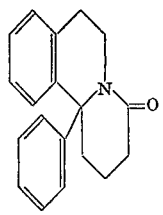

Heat a solution of 5 parts of N-(2-phenylethyl)-4-benzoyl-butyramide in 50 parts of polyphosphoric acid at 100° for 16 hours. Admix the thus-obtained dark brown reaction mixture with 300 parts by volume of water and 300 parts by volume of chloroform; wash the organic phase with I N sodium carbonate solution; dry same over sodium sulfate and evaporate under reduced pressure. Filter a solution of the thus-obtained residue in 1000 parts by volume of a 1:1 benzene-chloroform mixture through a bed of alumina and evaporate the eluant in vacuo. Crystallize the resultant oil from benzene-pentane (1:3) to obtain the pure title compound, M.P. 126° to 128°.

Replacing the N-(2-phenylethyl)-4-benzoylbutyramide with an equivalent of either N-[2-(3,4-dimethoxyphenyl) ethyl] - 4 - benzoylbutyramide or N-[2-(3,4-dimethoxyphenyl)ethyl]-5-benzoylvaleramide results in the preparation, in similar manner, of the corresponding compound VI.

EXAMPLE 9

N-[2-(3,4-dimethoxyphenyl)ethyl]-3-benzoylpropionamide

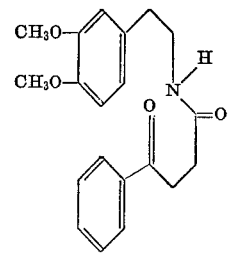

Add dropwise (over a period of one hour) to a stirred solution of 17.8 parts (0.10 mole) of 3-benzoylpropionic acid and 10.1 parts (0.10 mole) of triethylamine in 175 parts by volume of chloroform, with the temperature range of 0° to 5°, a solution of 10.8 parts (0.10 mole) of ethylchloroformate in 25 parts by volume of chloroform. Stir the resultant for an additional three hours. To the thus-stirred solution, add dropwise (over a period of fifteen minutes) a chloroform (100 parts by volume of chloroform) solution of 18.1 parts (0.10 mole) of β-(3,4-dimethoxyphenyl)ethylamine. Stir the thus-obtained reaction mixture overnight; extract same with dilute hydrochloric acid; wash with dilute sodium carbonate solution; dry over sodium sulfate and evaporate in vacuo. Crystallize the residue from benzene-pentane (1:3) to obtain the title compound, M.P. 94° to 95°.

Replacing the 3-benzoylpropionic acid with an equivalent of 3-(3-propylbenzoyl)propionic acid results in the preparation, in similar manner, of the corresponding compound V.

EXAMPLE 10

8,9-dimethoxy-10b-phenyl-1,2,3,5,6,10b-hexahydropyrrolo[2,1-a]isoquinolin-3-one

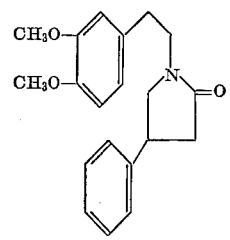

Heat under reflux for 12 hours a solution of 28 parts of N - [2-(3,4-dimethoxyphenyl)ethyl]-3-benzoylpropionamide in 600 parts by volume of methanol containing 15 parts by volume of concentrated hydrochloric acid. Make the reaction mixture basic with the addition thereto of sodium bicarbonate solution and extract with ether. Dry the ether phase over sodium sulfate and evaporate in vacuo. Recrystallize the crystalline residue from methanol to obtain the titled compound, M.P. 146° to 147°.

The process illustrated by this example and Example 13 appears to be specific to the preparation of 8,9-dimethoxy-10b-aryl-1,2,3,5,6,10b - hexahydropyrrolo[2,1-a]isoquinolin-3-one.

EXAMPLE 11

8,9-dimethoxy-10b-phenyl-1,2,3,5,6,10b-hexahydropyrrolo[2,1-a]isoquinoline

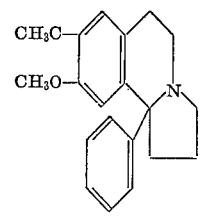

Add dropwise to a solution of 4.5 parts of lithium aluminum hydride (LAH) in 300 parts by volume of diethylether heated under reflux a solution of 12 parts of 8,9-dimethoxy-10b-phenyl - 1,5,6,10b-tetrahydropyrrolo[2,1-a]isoquinolin-3one in 150 parts by volume of tetrahydrofuran (THF). After heating the resultant for six hours, add (successively) 20 parts by volume of ethylacetate and 25 parts by volume of water; filter the reaction mixture. Evaporate the filtrate in vacuo and crystallize the residue from benzene-pentane (1:5) to obtain the pure title compound, M.P. 95° to 96°.

Replacing the 8,9-dimethoxy-10b-phenyl-1,5,6,10b-tetrahydropyrrolo[2,1-a]isoquinolin-3-one with an equivalent of 10b-phenyl-1,5,6,10b-tetrahydropyrrolo[2,1-a]isoquinolin-3(2H)-one results in the preparation, in similar manner, of the corresponding compound I.

EXAMPLE 12

N-[2-(3,4-dimethoxyphenyl)ethyl]-3-(α-thienyl) propionamide

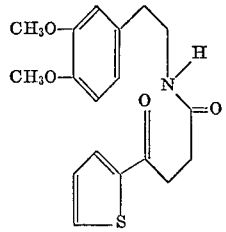

Add dropwise (over a period of one hour) to a stirred solution of 36 parts (0.20 mole) of 3-(α-thenoyl) propionic acid and 20.2 parts (0.20 mole) of triethylamine in 175 parts by volume of chloroform, within the temperature range of 0° to 5°, a solution of 21.6 parts (0.20 mole) of ethylchloroformate in 25 parts by volume of chloroform. Stir the resultant for an additional three hours. To the thus-stirred solution, add dropwise (over a period of fifteen minutes) a chloroform (150 parts by volume of chloroform) solution of 36.2 parts (0.20 mole) of β-(3,4-dimethoxyphenyl)-ethylamine. Stir the thus-obtained reaction mixture overnight; extract same with dilute hydrochloric acid; wash with dilute sodium carbonate solution; dry over sodium sulfate and evaporate in vacuo. Crystallize the residue from benzene-pentane (1:4) to obtain the title compound, M.P. 121° after melting and resolidifying at 101°.

Replacing the 3-(α-thenoyl)propionic acid with an equivalent of either 3-(β-thenoyl)propionic acid, 3-(α-furoyl)propionic acid, 3-(β-furoyl)propionic acid, 3-(2-pyridinecarbonyl)propionic acid, 3-(3-pyridinecarbonyl) propionic acid or 3-(4-pyridinecarbonyl)propionic acid results in the preparation, in similar manner, of the corresponding compound V.

EXAMPLE 13

8,9-dimethoxy-10b-(2-thienyl)-1,2,3,5,6,10b-hexahydropyrrolo[2,1-a]isoquinolin-3-one

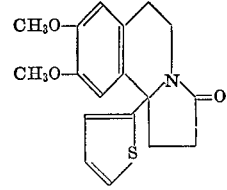

Heat under reflux for 12 hours a solution of 30 parts of N-[2-(3,4 - dimethoxyphenyl)ethyl] - 3 - (α - thenoyl) propionamide in 600 parts by volume of methanol containing 15 parts by volume of concentrated hydrochloric acid. Make the reaction mixture basic with the addition thereto of sodium bicarbonate solution and extract same with diethylether. Dry the ether phase over sodium sulfate and evaporate in vacuo. Recrystallize the crystalline residue from methanol to obtain the title compound, M.P. 126° to 127°.

EXAMPLE 14

8,9-dimethoxy-10b-(2-thienyl)-1,2,3,5,6,10b-hexahydropyrrolo[2,1-a]-isoquinoline

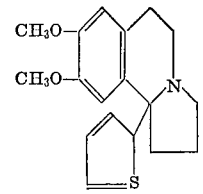

Add dropwise to a solution of 4.5 parts of LAH in 300 parts by volume of diethylether heated under reflux a solution of 20 parts of 8,9-dimethoxy-10b-(2-thienyl-1,5,6,10b-tetrahydropyrrolo[2,1-a]isoquinolin - 3 - one in 180 parts by volume of THF. After heating the resultant for seven hours, add (successively) 25 parts by volume of ethylacetate and 30 parts by volume of water; filter the reaction mixture. Evaporate the filtrate in vacuo and crystallize the residue from benzene-pentane (1:5) to obtain the pure title compound, M.P. 77° to 79°.

Replacing the 8.9-dimethoxy-10b-(2-thienyl)-1,5,6,10b-tetrahydropyrrolo[2,1-a]isoquinolin - 3(2H) - one with an equivalent of 11b-phenyl-1,2,6,7-tetrahydro-11bH - benzo[a]quinolizin-4(3H)-one results in the preparation, in similar manner, of the corresponding compound I.

EXAMPLE 15

10b-phenyl-1,2,3,5,6,10b-hexahydropyrrolo[2,1-a] isoquinoline hydrochloride

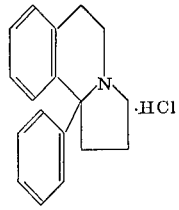

Add to a solution of 22 parts of 11b-phenyl-1,2,6,7-tetra-11bH-benzo[a]quinolizin-4(3H)-one in 200 parts phenyl-1,5,6,10b-tetrahydropyrrolo[2,1 - a]isoquinolin - 3 (2H)one in 200 parts by volume of THF and reflux the thus-prepared reaction mixture for 24 hours. Thereafter, decompose the reaction mixture by the addition thereto of water before filtering through Celite. Evaporate the filtrate in vacuo.

Dissolve the residue (from the evaporated filtrate) from diethylether. Bubble dry hydrogen chloride gas through the resulting solution until the title compound precipitates. Crystallize the precipitate from acetone to obtain the title compound, M.P. 176 to 178°.

EXAMPLE 16

11b-phenyl-1,2,3,4,6,7-hexahydro-11bH-benzo[a] quinolizine hydrochloride

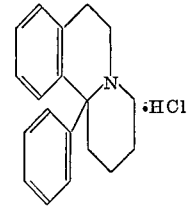

Add a solution of 22 parts of 11b-phenyl-1,2,6,7-tetrahydro-11bH-benzo[a]quinolizin-4(3H)-one in 200 parts by volume of THF to a solution of 10 parts of LAH in 500 parts by volume of diethylether, and reflux the thus-prepared mixture for 24 hours. Thereafter decompose the reaction mixture by adding water thereto prior to filtering same though Celite. Evaporate and filtrate in vacuo.

EXAMPLE 17

9,10-dimethoxy-11b-phenyl-1,2,3,4,6,7-hexahydro-11bH-benzo[a]quinolizine

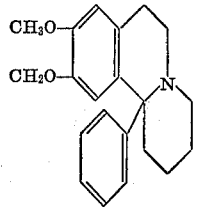

Add a solution of 26 parts of 9,10-dimethoxy-11b-phenyl-1,3,4,6,7,11b-hexahydro - 2H - benzo[a]quinolizin-4-one in 200 parts by volume of THF to a solution of 15 parts of LAH in 500 parts by volume of diethylether and reflux the thus obtained reaction mixture for 24 hours. Decompose the reaction mixture thereafter, by adding 75 parts by volume of water thereto, and then filter the resultant through Celite. Evaporate the filtrate in vacuo and crystallize the obtained residue from 1:3 benzene/pentane to obtain the title compound, M.P. 127° to 128°.

To obtaine 9,10-dimethoxy - 11b - phenyl-1,3,4,6,7,11b-hexahydro - 2H - benzo[a]quinolizin-4-one, reflux (with a water separator) 50 parts of the title compound of Example 3 and 10 parts of p-toluenesulfonic acid in toluene for 48 hours. Then cool the refluxed material to room temperature by washing same with aqueous sodium carbonate solution. Dry the toluene layer and then evaporate same to dryness. Crystallize the obtained residue from benzene, M.P. 160° to 162°.

EXAMPLE 18

8,9-dimethoxy-10b-phenyl-1,2,3,5,6,10b-hexahydropyrrolo[2,1-a]isoquinoline methiodide

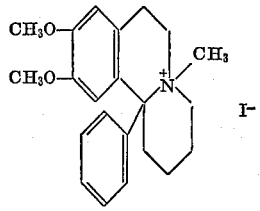

Prepare a solution of 10 parts of the title compound of Example 11 in 13 parts by volume of methanol, 90 parts by volume of diethylether and 20 parts by volume of methyl iodide. Maintain the resultant at 8° for fifteen hours. Recrystallize the formed crystals from methanol to obtain the title compound, M.P. 260° to 262°.

EXAMPLE 19

8,9-dimethoxy-10b-propyl-1,2,3,5,6,10b-hexahydropyrrolo[2,1-a]isoquinoline bimaleate

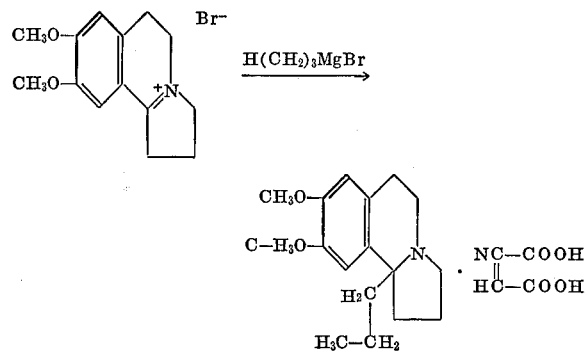

Add 15.6 parts of 8,9-dimethoxy-1,2,3,5,6,10b-hexahydropyrrolo[2,1-a]isoquinolinium bromide to a solution of Grignard reagent (prepared from 24 parts of magnesium and 123 parts of n-propyl bromide) in 1000 parts by volume of diethylether. Reflux the thus-obtained mixture (with stirring) for 24 hours and then pour same onto ice and dilute ammonium hydroxide. Extract the aqueous phase three times with diethylether. Dry the combined ethyl extracts over sodium sulfate, and evaporate the resultant in vacuo.

Dissolve the thus-obtained residue in ethanol. Mix a solution of 5.5 parts of maleic acid in 25 parts by volume of ethanol with the ethanolic residue solution. Add ether to the resultant to precipitate the title compound, M.P. 142° to 144°.

EXAMPLE 20

10b-benzyl-8,9-dimethoxy-1,2,3,5,6,10b-hexahydropyrrolo[2,1-a]isoquinoline bimaleate

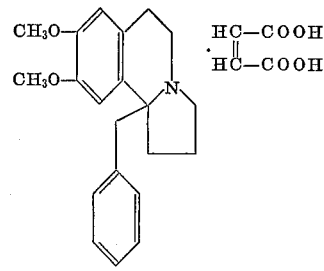

Add 31.2 parts of 8,9-dimethoxy-1,2,3,5,6,10b-hexahydropyrrolo[2,1-a]isoquinolinium bromide to a solution of Grignard reagent (prepared from 48 parts of magnesium and 342 parts of benzyl bromide) in 2000 parts by volume of diethylether. Stir the resulting mixture under reflux for 24 hours and then pour same onto ice and dilute (aq) ammonium hydroxide. Extract the aqueous phase three times with diethylether. Dry the combined ether extracts over sodium sulfate and evaporate same in vacuo.

Dissolve the thus-obtained residue in ethanol. Mix a solution of 11.0 parts of maleic acid in 50 parts by volume of methanol with the ethanolic residue solution. Add ether to the resultant to precipitate the title compound, 159° to 161°.

EXAMPLE 21

10b-p-chlorobenzyl-8,9-dimethoxy-1,2,3,5,6,10b-hexahydropyrrolo[2,1-a]isoquinoline

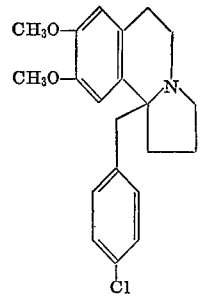

Add 44 parts of 8,9-dimethoxy-1,2,3,5,6,10b-hexahydropyrrolo[2,1-a]isoquinolinium bromide to a solution of Grignard reagent (prepared from 65 parts of magnesium and 456 parts of p-chlorobenzyl bromide) to 2500 parts by volume of diethylether. Stir the thus obtained mixture under reflux for 24 hours before pouring same onto ice and dilute ammonium hydroxide. Extract the aqueous phase three times with diethylether. Dry the combined ether extracts over sodium sulphate before evaporating same in vacuo. Crystallize the thus-obtained residue from 1:3 benzene-pentane to obtain the title compound, 125° to 126°.

EXAMPLE 22

11b-p-chlorobenzyl-9,10-dimethoxy-1,2,3,4,6,7-hexahydro-11bH-benzo[a]quinolizine

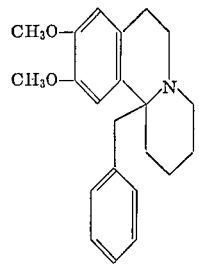

Add a solution of Grignard reagent (prepared from 6 parts of magnesium and 36 parts of p-chlorobenzylchloride) in 500 parts by volume of diethylether (with stirring) to a solution of 23 parts of glutaric anhydride and 500 parts by volume of benzene (with cooling). After stirring the resultant for two hours, add the thus-obtained reaction mixture to 500 parts by volume of water and 300 parts by volume of dilute ammonium hydroxide. Discard the organic layer. Make the aqueous phase acidic with hydrochloric acid prior to extracting said layer with methylene chloride. Dry the organic extract over sodium sulphate and evaporate same in vacuo to obtain γ-(p-chlorobenzyl)-γ-keto butyric acid as a semi-crystalline solid.

Heat under reflux for 18 hours (with a water separator) 12 parts of γ-(p-chlorobenzyl)-γ-keto butyric acid, 9 parts of 3,4-dimethoxy-β-phenethylamine and 0.15 part of p-toluenesulfonic acid in 300 parts by volume of toluene. Concentrate the resulting solution in vacuo. Dissolve the obtained concentrate in chloroform before washing same with 2 N hydrochloric acid and then with 2 N sodium carbonate solution. Dry the resultant over sodium sulphate, and then evaporate same in vacuo. There is thus obtained a crude residue of N-[2-(3,4-dimethoxyphenyl)ethyl] - 5 - (p - chlorobenzyl)-5-ketovaleriamide.

Heat a mixture of 28 parts of the crude residue in 500 parts by volume of methanol and 25 parts by volume of concentrated hydrochloric acid under reflux for 24 hours. Then concentrate the refluxed mixture in vacuo. Dilute the concentrate with water to obtain 9,10-dimethoxy-11b-(p-chlorobenzyl)-1,2,3,6,7,11b - hexahydro - 4H - benzo[a]quinolizin-4-one, M.P. 187° to 189°.

Add a solution of 25 parts of 11b-(p-chlorobenzyl)-1,2,3,5,6,11b - hexahydro - 4H - benzo[a]quinolizin - 4-one in 200 parts by volume of THF to a solution of 10 parts of LAH and 500 parts by volume of ethyl and reflux the residue for 24 hours. Decompose the refluxed reaction mixture by adding water thereto and then filter same through Celite. Evaporate the filtrate in vacuo and crystallize the residue from diethylether to obtain the title compound, M.P. 122° to 123°.

The invention and its advantages are understood from the foregoing description. Various changes may be made in the intermediates and the final products (including the pharmaceutically acceptable acid addition salts of compounds I) without departing from the spirit and the scope of the invention or sacrificing its material advantages. The starting materials, intermediates and final products set forth hereinbefore are merely illustrative embodiments.

What is claimed is:

1. A compound selected from the group consisting of a free base, a pharmaceutically acceptable acid addition salt thereof, the free base being of the formula

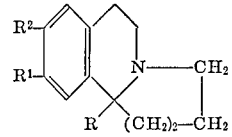

wherein
R is a member selected from the group consisting of 1–4 carbon linear alkyl, benzyl, p-chlorobenzyl, phenethyl, phenylpropyl, β,β-diphenylethyl, γ,γ-diphenylpropyl, α-furyl, β-furyl, α-thienyl, β-thienyl, 2-pyridyl, 3-pyridyl, 4-pyridyl and 3-$R^3$-4-$R^4$-5-$R^5$-phenyl;
each of $R^1$ and $R^2$ is a member selected from the group consisting of a hydrogen atom, 1–4 carbon linear alkoxy and, taken together, methylenedioxy; and
each of $R^3$, $R^4$ and $R^5$ is a member selected from the group consisting of a hydrogen atom, chloro, fluoro, 1–4 carbon linear lower alkyl, 1–4 carbon linear alkoxy and, together with its counterpart on an adjacent carbon atom, methylenedioxy.

2. A compound according to claim 1 wherein R is phenyl.

3. The compound according to claim 2 which is 11b-phenyl - 1,2,3,4,6,7 - hexahydro - 11bH - benzo[a]quinolizine hydrochloride.

4. The compound according to claim 2 which is 11b-phenyl-1,2,3,4,6,7-hexahydro-11bH-benzo[a]quinolizine.

5. The compound according to claim 2 which is 9,10-dimethoxy - 11b - phenyl - 1,2,3,4,6,7-hexahydro-11bH-benzo[a]quinolizine.

6. A compound according to claim 1 wherein R is p-chlorobenzyl.

7. The compound according to claim 6 which is 11b-p-chlorobenzyl - 9,10 - dimethoxy - 1,2,3,4,6,7 - hexahydro-11bH-benzo[a]quinolizine.

References Cited
UNITED STATES PATENTS 3,498,988    3/1970    Houlihan et al. _____ 260—289

DONALD G. DAUS, Primary Examiner

U.S. Cl. X.R.
260—286 Q, 289 R